G. KNOTH.
Fodder-Cutter.

No. 202,553. Patented April 16, 1878.

Witnesses.
Otto Hufeland
Hugo Brueggemann

Inventor.
George Knoth
by
Van Santvoord & Hauff
his attorneys

UNITED STATES PATENT OFFICE.

GEORGE KNOTH, OF BRESLAU, NEW YORK.

IMPROVEMENT IN FODDER-CUTTERS.

Specification forming part of Letters Patent No. 202,553, dated April 16, 1878; application filed February 2, 1878.

*To all whom it may concern:*

Be it known that I, GEORGE KNOTH, of Breslau, in the county of Suffolk and State of New York, have invented a new and useful Improvement in Fodder-Cutters, which improvement is fully set forth in the following specification, reference being had to the accompanying drawing, in which—

Figure 1:
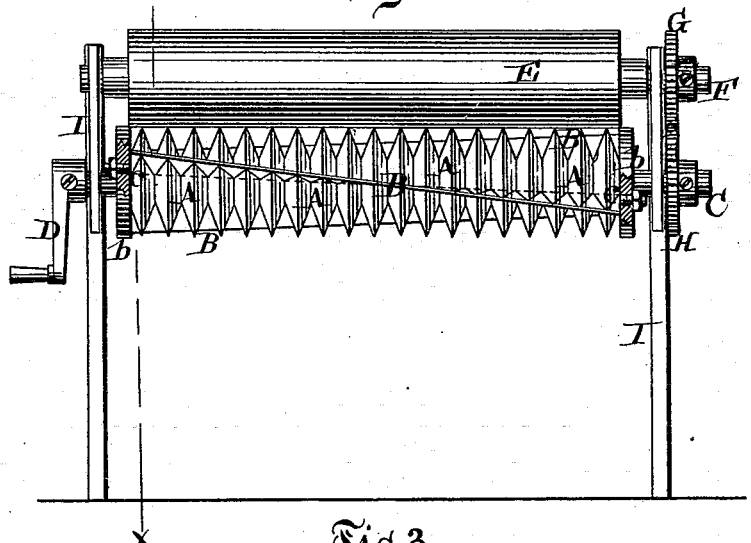
Figure 3:
Figure 2:
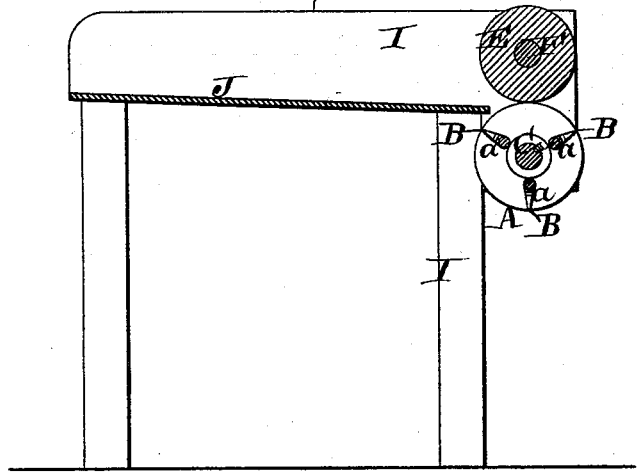
Figure 4:

Figure 1 represents a front view of a machine embracing my invention. Fig. 2 is a vertical section thereof in the line $x\ x$, Fig. 1. Fig. 3 is a front view of one of the oblique knives. Fig. 4 is a side view of one of the circular knives.

Similar letters indicate corresponding parts.

My invention relates especially to that class of machines used for cutting corn-stalks and similar substances; and it consists in a series of circular knives, which are secured on a suitable shaft and provided with recesses in their peripheries, in combination with oblique knives, which are inserted in said recesses and fastened at their opposite ends, so that an effective union between the knives is obtained, and one which permits of detaching any of the knives with facility, while, by the combined action of the circular and oblique knives, corn-stalks or similar substances can be cut both lengthwise and crosswise in one operation.

In the drawing, the letter A designates the circular knives, and B are the oblique knives, of my cutter. C is a shaft, on which the circular knives are secured, and $a$ are recesses formed in the latter for the reception of the longitudinal knives. I secure the circular knives A on the shaft C by means of a feather-key, as shown in Fig. 2, and to permit of giving a revolving motion to said shaft, I provide the same with a crank, D. The oblique knives B and the recesses $a$ have a tapering form, so that when these knives are inserted in the recesses they are held against a radial movement. For the purpose of holding the oblique knives B lengthwise they are fastened at their opposite ends to collars $b$, which are secured to the knife-shaft C in any suitable way, the knives being provided with tenons $c$, which pass through said collars, and are held by screw-nuts.

The circular knives A are arranged in superficial contact with a roller, E, mounted on a shaft, F, which, in the example shown, is geared with the knife-shaft C by means of cog-wheels G H. The shafts C and F have their bearings in a frame, I, forming part of a trough, J, in which the substances to be cut are placed, and which serves to conduct them between the roller E and the knives.

When a revolving motion is imparted to the knife-shaft C, and corn-stalks or other substances are fed between the knives and the roller E, the stalks are cut by the circular knives A into lengths equal to the distances between the circular knives, while at the same time the stalks are split lengthwise by the oblique knives.

By uniting the circular knives A and the oblique knives B in the manner stated, I am enabled to detach any of the knives for the purpose of substituting a new one, or for any other purpose, and also to put them together with extreme facility.

What I claim as new, and desire to secure by Letters Patent, is—

The combination, in a fodder-cutter, of a series of circular knives secured to a suitable shaft, and having recesses in their peripheries, with oblique knives, which are inserted in said recesses and fastened at their opposite ends, substantially as shown and described.

In testimony that I claim the foregoing I have hereunto set my hand and seal this 26th day of January, 1878.

GEORGE KNOTH. [L. S.]

Witnesses:
W. HAUFF,
E. F. KASTENHUBER.